(12) United States Patent
Wartenberg

(10) Patent No.: US 8,532,922 B2
(45) Date of Patent: Sep. 10, 2013

(54) METHOD FOR SIMPLIFYING A DESCRIPTION OF A ROUTE OF TRAVEL

(75) Inventor: Maylin Wartenberg, Meine/Wedelheine (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/512,119

(22) PCT Filed: Nov. 26, 2010

(86) PCT No.: PCT/EP2010/068268
§ 371 (c)(1),
(2), (4) Date: Aug. 31, 2012

(87) PCT Pub. No.: WO2011/067169
PCT Pub. Date: Jun. 9, 2011

(65) Prior Publication Data
US 2012/0323486 A1    Dec. 20, 2012

(30) Foreign Application Priority Data
Dec. 2, 2009  (DE) .......................... 10 2009 047 407

(51) Int. Cl.
*G06F 19/00* (2011.01)

(52) U.S. Cl.
USPC ........... 701/428; 701/434; 701/435; 701/436; 701/532; 701/533; 379/14; 379/15.01; 379/112.01; 379/112.06; 379/112.07; 709/206; 709/220; 709/223; 709/224; 709/227; 370/329; 370/352; 370/358; 370/395.21; 370/401; 455/62; 455/452.2; 703/6; 703/8; 706/905; 726/11

(58) Field of Classification Search
USPC .................. 701/1, 30, 45, 70, 120, 434, 435, 701/436, 532, 533; 379/14, 15.01, 112.01, 379/112.06, 112.07, 112.09, 224; 709/206, 709/220, 223, 224, 227, 229, 245, 249; 370/358, 329, 252, 395.21, 401; 455/62, 455/452.2; 703/6, 8; 706/905; 726/11
See application file for complete search history.

(56) References Cited

U.S. PATENT DOCUMENTS

| | | | | |
|---|---|---|---|---|
| 5,848,373 | A * | 12/1998 | DeLorme et al. | 701/455 |
| 6,317,058 | B1 * | 11/2001 | Lemelson et al. | 340/910 |
| 6,321,158 | B1 * | 11/2001 | DeLorme et al. | 701/426 |
| 7,202,776 | B2 * | 4/2007 | Breed | 340/435 |
| 8,269,652 | B2 * | 9/2012 | Seder et al. | 340/903 |
| 8,350,724 | B2 * | 1/2013 | Szczerba et al. | 340/932.2 |
| 8,358,224 | B2 * | 1/2013 | Seder et al. | 340/995.24 |
| 8,384,531 | B2 * | 2/2013 | Szczerba et al. | 340/435 |
| 8,384,532 | B2 * | 2/2013 | Szczerba et al. | 340/435 |
| 8,395,529 | B2 * | 3/2013 | Seder et al. | 340/905 |

OTHER PUBLICATIONS

Kamijo et al., Digital Road Map Data Base for Vehicle Navigation and Road Information Systems, 1989, IEEE, p. 319-323.*

(Continued)

*Primary Examiner* — McDieunel Marc
(74) *Attorney, Agent, or Firm* — Kenyon & Kenyon LLP

(57) ABSTRACT

A method for simplifying a description of a travel route represented by a list of route points includes: reading in a travel route which is mapped by a list of route points represented by a plurality of route points, each route point representing a different subsegment of a travel route on a digital road map; altering the list of route points according to a predetermined algorithm, in order to obtain an altered list of route points that represents the travel route; and storing the altered list of route points in order to simplify the description of the travel route.

11 Claims, 8 Drawing Sheets

(56) References Cited

OTHER PUBLICATIONS

Bullock et al., Analysis of the Use of Digital Road Maps in Vehicle Navigation, 1994, IEEE, p. 494-501.*

Claussen et al., GDF, A Proposed Standard for Digital Road Maps to be Used in Car Navigation Systems, 1989, IEEE, p. 1-7.*

Lee et al., KATECH's Efforts of the Standardization of the Korean Digital Road Map for Navigation and Implementation of the Shortest Path Algorithm Using the Vector Topology Data, 1996, IEEE, p. 1-6.*

* cited by examiner

METHOD FOR SIMPLIFYING A DESCRIPTION OF A ROUTE OF TRAVEL

BACKGROUND OF THE INVENTION

1. Field of the Invention

The present invention relates to a device and a method for simplifying a description of a travel route.

2. Description of the Related Art

Conventional navigation systems may require that the digital map be replaced owing to an update. In this case, for example, the existing routes that are frequently travelled and are stored in the navigation device can no longer be used because of the possibility that the existing route points, which describe the travel route on the map, can no longer be mapped onto the corresponding route segments on the new map. The reason for this situation may lie, for example, in the fact that the new road map comes from a different map manufacturer using a different geographic map grid than the map manufacturer who delivered the digital map that was used before. In such a case, the stored reference points or route points would then be mapped to positions on the new map that do not lie on the actual road segments. In order to be able to continue to use these stored routes of travel nevertheless, it becomes mandatory to adapt the travel route to the new road map that is to be used. Moreover, the map update can also cause a slight displacement of the roads, for example, when a construction project at a specific position results in an expansion of the road or in the construction of a new traffic circle that is now considered on the new digital map that is to be used. To date the known approaches have not described how such a transfer of the stored routes of travel could be carried out, taking into consideration the new digital map.

The known methods only describe a so-called location referencing system for identifying a place on a digital map of the road network (the so-called coding) and for identifying (by machine) the same place on a second digital map (the decoding). In this case the places, so-called locations, may be individual points, linear route segments, subgraphs or abstract areas. In the past the trend has been to develop location referencing methods with a focus on linear route segments. There exist strategies for transferring networks or subgraphs of the road graph, where the network is decomposed into linear locations. However, to date there is no exact description of how this decomposition functions. In addition, these approaches have not been tested yet.

BRIEF SUMMARY OF THE INVENTION

The present invention provides a method for simplifying a description of a travel route that is represented by a list of route points, and the method includes the following steps:

reading in a travel route that is mapped by a list of route points that is represented by a plurality of route points, and each route point represents a different subsegment of a travel route on a digital road map;

altering the list of route points according to a predetermined algorithm, in order to obtain an altered list of route points that represents the route of travel; and storing the altered list of route points, in order to simplify the description of the travel route.

Furthermore, the present invention provides a method for decoding a travel route of a vehicle from a list of route points, and the method includes the following steps:

reading in the list of route points, and each route point represents a different subsegment of a travel route to be decoded, on a digital road map;

receiving a digital road map;

selecting at least two of the route points and mapping the selected route points onto different first segments on the digital road map, and where the various first segments represent possible subsegments of a travel route to be selected by the vehicle;

determining the entire first distance of the route, and the entire first distance of the route is determined on the basis of the lengths of the individual first segments on the digital road map;

mapping the selected route points onto different second segments of the digital road map, and the different second segments represent possible subsegments of the travel route to be selected by the vehicle;

determining the entire second distance of the route, and the entire second distance of the route is determined on the basis of the length of the individual second segments on the digital road map; and allocating the route points to the first segments, when the determined first distance of the route is shorter than the determined second distance.

Furthermore, the present invention provides a navigation device that is designed to carry out or implement the steps of the method according to the present invention.

Even this design variant of the present invention in the form of a navigation device can achieve the engineering object of the present invention in a fast and efficient way.

In the present invention the term navigation device can be defined as an electric device or a computer unit that processes the sensor signals. The navigation device may have an interface that can be implemented in hardware and/or software. In a hardware oriented design the interfaces can be, for example, a part of a so-called system ASIC that includes a wide range of functions of the navigation device. However, it is also possible that the interfaces are intrinsic integrated circuits or are made up at least to some extent of discrete components. In a software implementation the interfaces may be software modules that are present, for example, on a microcontroller, in addition to other software modules.

Advantageous is also a computer program product having program code, which is stored on a machine readable medium, such as a semiconductor memory, a hard disk memory or an optical memory, and is used to carry out the method according to one of the above-described embodiments, when the program is executed on a navigation device.

The present invention is based on the knowledge that a simple differentiation of a subgraph of a road network is possible when a route to be travelled is described by few route points. In order to be able to represent the route of travel with as few route points as possible, the first step is to reduce the route points during the coding of the travel route in such a way that a list containing as few route points as possible describes as accurately as possible the travel route that is to be selected or that is selected. For this purpose certain algorithms are used, in order to make a change in the list of route points, where, for example, the route points that are deleted represent subsegments of the travel route in the road network that have a very short distance. In order to simplify the list of route points, it is also possible to delete every second, third, etc. route point from the list. Although the result may be a less precise description of the route of travel, it is still accurate enough to reconstruct the travel route, when the remaining route points are transferred into a digital map and, for example, the shortest connection between these route points is determined as a subsegment of the route of travel. This procedure also makes it possible to transfer a desired travel route that was found on the basis of a first digital map, into a second digital map. In this case the decoding of the travel route is performed with the aid of the list of route points, for example, in such a way that the route points on the list are transferred into the second digital map. If it is found during this procedure that geographic coordinates, which form, for example, the corresponding route points, do not lie on a road or a route open to traffic on the second digital map, these route points may be moved to the nearest road or the nearest route. Then the desired route of travel may be decoded with the use of the second digital map in such a way that the roads or routes from the second digital map are selected as subsegments of the desired travel route that constitute the shortest connection between the route points or the correspondingly displaced route points.

At the same time the present invention offers the advantage that, first of all, a previously known and frequently travelled route can be stored in a very simple and memory space saving way with the said short list of route points. Secondly the list of route points may be used very efficiently in order to simplify the transfer of a desired route of travel or a route is that is to be travelled into a different digital map. In this case both the first and second aforementioned aspects have the advantage that very little numerical computation effort or circuitry is required to implement or realize the present invention.

One embodiment of the present invention provides that in the step of reading in the travel route, route points that represent geographic coordinates may be read in. Such an embodiment of the present invention offers the advantage that the information about geographic coordinates makes it possible to determine the route points with a very high degree of accuracy. In addition, when the grid networks of a digital first map, from which the route points were generated, differ from those of a digital second map, to which the list of route points is supposed to be applied, very simple corresponding transformations may be applied to shift and uniquely allocate the route points even on the new digital second map.

In an additional embodiment of the present invention the step of altering may also use an algorithm. When this algorithm is applied, the route points that represent a subsegment of the travel route that maps a route segment that is shorter than a predetermined distance are removed from the list. Such an embodiment of the present invention offers the very simple possibility of reducing a number of route points on the list of route points without having to be fearful of a significant loss of information. For example, it is possible to remove from the list all route points that represent a subsegment of the travel route that maps a route or a road on the digital road map that is shorter than 100 meters.

Furthermore, it is advantageous if the step of altering also uses an algorithm. When this algorithm is applied, each nth route point is removed from the list, where the variable n denotes a natural number. Such an embodiment of the present invention offers the advantage that a number of route points may be removed from the list of route points in a simple way without causing a significant degradation in the ability to reconstruct the desired route of travel.

Furthermore, in another embodiment of the present invention the method can have a step of receiving additional route points; and the additional route points represent subsegments of an alternative of a segment of the travel route, and wherein in the step of altering, at least one of the additional route points is incorporated into the list of route points. It is especially advantageous, if in the step of altering, additional route points are incorporated into the list of route points for the route of travel; and wherein the additional route points represent subsegments of an alternative of a segment of the travel route. Such an embodiment of the present invention offers the advantage that various travel route alternatives may be stored in a simple way without having to generate an own separate list of route points for each of these alternatives.

In addition or as an alternative, the method can also be carried out over and over again while the vehicle is moving. Following a preceding execute cycle of the method, the step of reading in reads in at least one new route point that represents a current position of the vehicle, during a subsequent execute cycle of the method while the vehicle is moving; and the repeated execution of the method results in the is travel route of the vehicle being updated. Such an embodiment of the present invention offers the advantage that an optimization can be carried out not only for a prefinished travel route, but also that during the trip it is possible to record the route that is currently travelled by the vehicle. Then the recording to the travel route may be stored in a memory space saving way in a list of route points that can be optimized in a manner analogous to the above description.

In order to be able to store in an efficient way a travel route in subsegments of a digital road map that have not been travelled before, another embodiment of the present invention also provides a method including a step of detecting the current position of the vehicle. Furthermore, the method has a step of matching the detected current position of the vehicle with a subsegment of the travel route that is represented by a route point; and in the step of altering the list, a route point that represents the currently travelled subsegment of the travel route is added to the list, when a route point that represents the currently travelled subsegment of the travel route is not stored in the list.

DETAILED DESCRIPTION OF THE INVENTION

Figure 1:
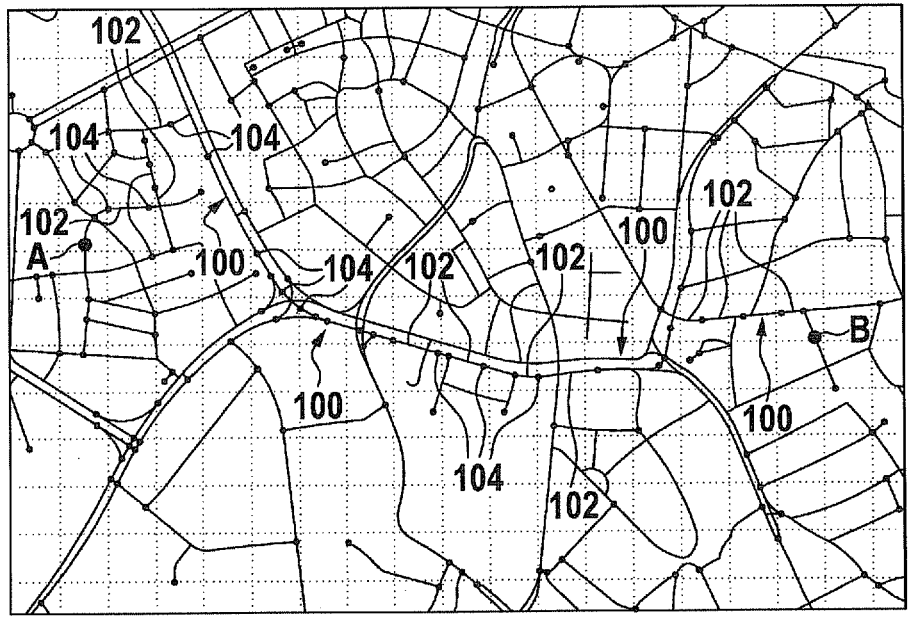
FIG. 1 shows a graph of a digital map, on which a travel route from a starting location to a destination location is marked by a plurality of route points.

Identical or similar elements may be marked with the same or similar reference numerals in the figures; and at the same time a repeated description is dispensed with. Furthermore, the figures of the drawings, the respective description and the claims contain a number of features in combination. In this respect it is clear to the person skilled in the art that these features may also be considered individually or they may be combined to form combinations that are not explicitly described in the present invention. Furthermore, the present invention is explained in the following description using a number of measures and dimensions, but the present invention is not limited to these measures and dimensions. Moreover, the steps of the method according to the present invention may be carried out repeatedly and in an order or sequence other than that described herein. If an exemplary embodiment has an "and/or" conjunction between a first feature/step and a second feature/step, then it may be read in such a way that the exemplary embodiment according to one embodiment has both the first feature/the first step and also the second feature/the second step; and according to another embodiment, either only the first feature/step or only the second feature/step.

An important object of the present invention is to develop a method for referencing a subgraph (in particular, for a desired travel route) of the road graph, which is generated from the driver's natural route selection and is, therefore, interconnected as a rule. At the same time the aim is to solve, in particular, the problem of dividing the travel route into segments to be referenced, so that the subgraph may be gradually decoded in a reasonable amount of time; and, thus, the method that is presented herein lends itself well to an application.

Working on this basis, the approach that is provided below thus focuses on the referencing of a subgraph of the road graph, which is generated, for example, gradually from the routes that the driver has travelled. The division into segments to be referenced takes place, for example, in parallel to the travelled route. One important aspect of the approach that is provided in the present invention is the identification of fixed positions in the road network, so-called routing points or route points, for which a predecessor/successor relationship is maintained. Then these route points can be stored in a list, so that the predecessor/successor relationship is also stored in the list. Successive routing points delimit the segments to be referenced. The selection of the positions and distances between two successive routing points is subject to certain conditions that make possible (or are supposed to make possible) an identification on the second map. For this identification one starts with a pair of routing points; and then the entire subgraph is gradually decoded using a suitable algorithm, such as the breadth-first search.

The coding and decoding of the referencing method is described in detail below. The choice of routing points and their distances for the successive routing points is subject to certain conditions that are supposed to make possible the identification on the second map. For example, in this case the so-called "routing point rules" from the AGORA-C standard can be used.

First, the coding of the travel route into route points is described in detail below with reference to a variety of exemplary embodiments of the present invention. One important aspect of the present invention with respect to the coding is the selection and positioning of the routing points. With which attributes and/or methods these routing points are then described is the second step. Two different approaches for selecting routing points along the travelled route shall be presented below.

Figure 2:
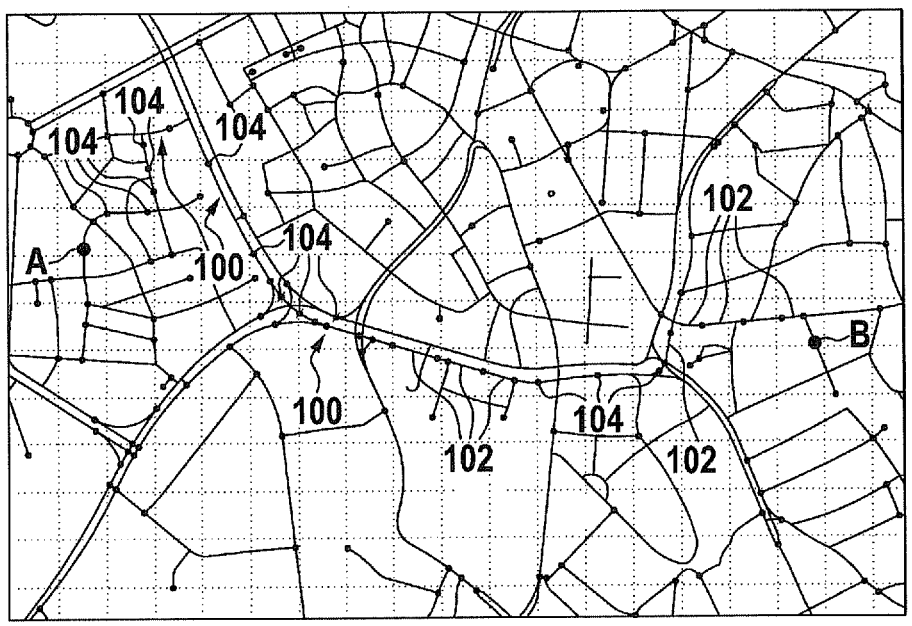
FIGS. 2-7 show in each case a graph of the digital map, on which the travel route from the starting location to the destination location is marked by a plurality of route points; and an additional embodiment of the present invention was applied to the route points or a corresponding list of route points.

The description of the first version starts with FIG. 1, which shows a graph of a digital map, on which a travel route 100 from a starting location A to a destination location B is marked by a plurality of route points. It is assumed that the driver starts at position A and drives in the direction B. On each link 102—i.e. each road segment represented by two delimiting points, travelled by the driver—a routing point 104, depicted by the black diamonds, is set. The positioning on link 102 is done either by specific quality criteria, as used in the MEI-LIN method, or according to fixed rules, such as always in a centered manner. After a specific travelled route or when the driver moves from unknown to known links, redundant routing points 104 are eliminated as follows. First, for example, all routing points 102 on "short" links are removed, such as the crossed out routing points in FIG. 2, as long as the aforementioned conditions for successive routing points are still met. In this case the attribute "short" may depend on the length in meters (for example, for actual segments of the travel route that are shorter than 100 meters for out-of-town roads or shorter than 50 meters for in-town roads) and also depend on the class of road or the relationship to a complex intersection.

Figure 3:
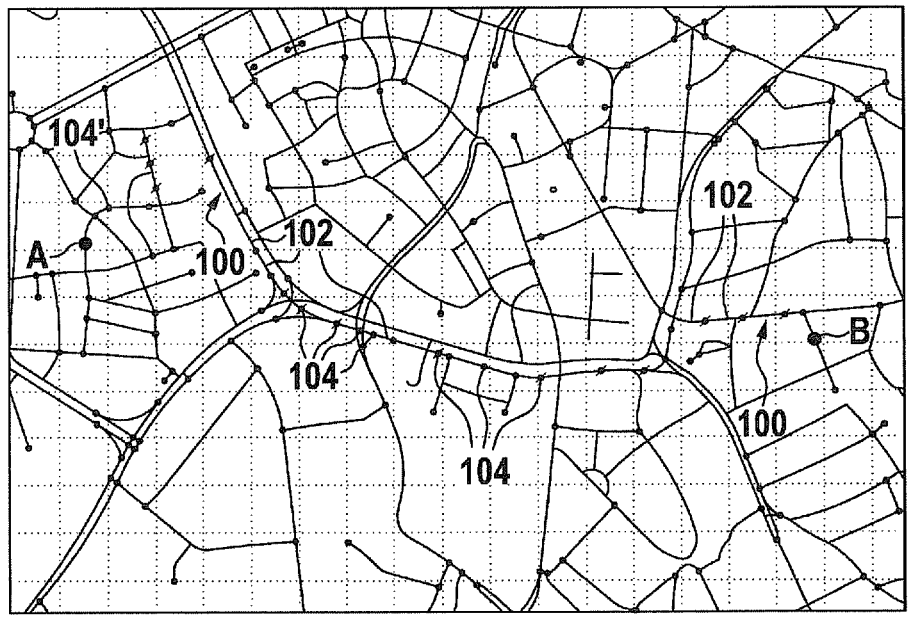
Figure 4:
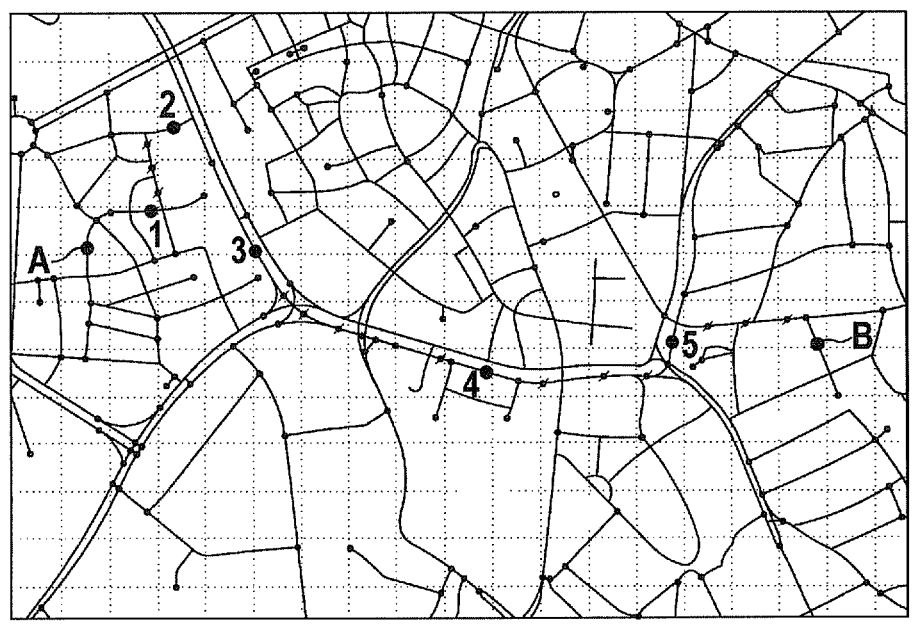

In a second step additional routing points 102 are eliminated, as apparent from FIG. 3. This process of elimination is carried out, for example, according to a fixed procedure, such as the iterative elimination of every second point 104'. On the other hand, it is also possible to develop a quality criterion for routing points 104 that assigns high importance to those points 104 that have a high probability of being easier to find again on a second map. These points may be, for example, points 104, which lie very close to intersections of roads, so that a corresponding position is very easy to determine even on the second map. An elimination of these points that are considered to be "high" or "important" for the reconstruction of the travel route can then be avoided. The next step is to eliminate at least one portion of the route points that are not ranked as "high" and are, thus, not considered to be "important" in accordance with this quality criterion, as long as the aforementioned conditions are met. FIG. 4 shows an example of the remaining and, thus, necessary routing points (that are marked with the numbers 2 to 5) between the starting location A and the destination location B.

Figure 5:
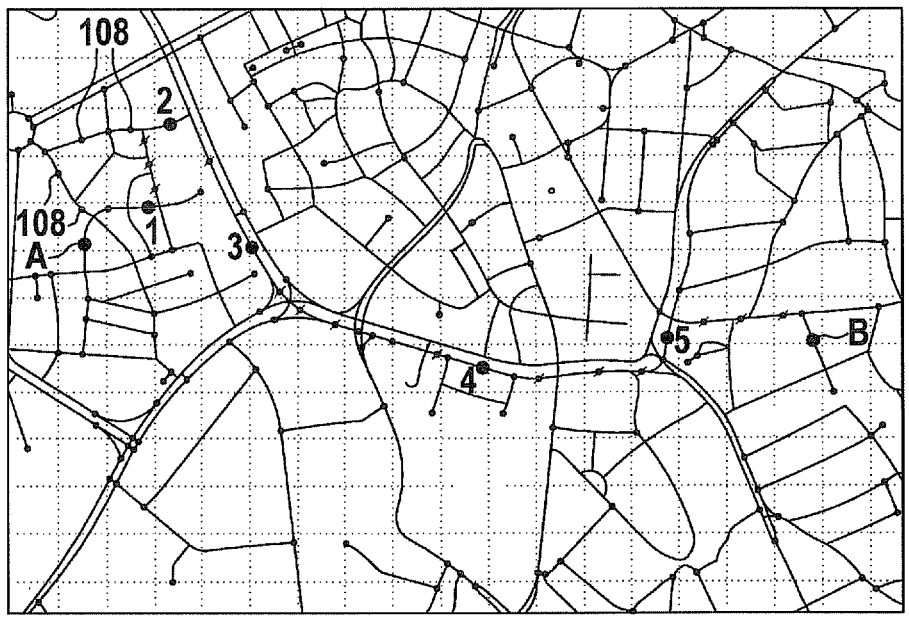
Figure 6:
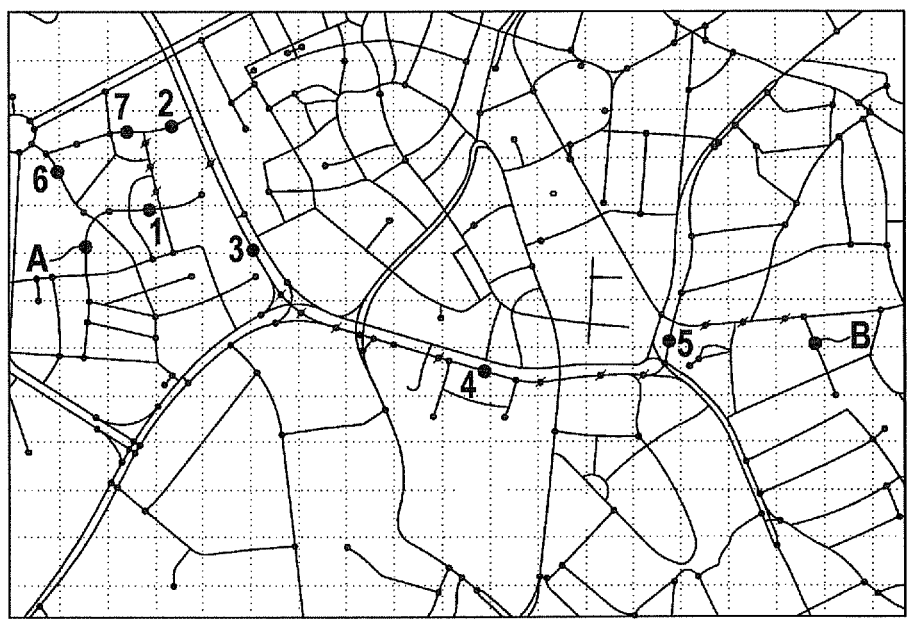
Figure 7:
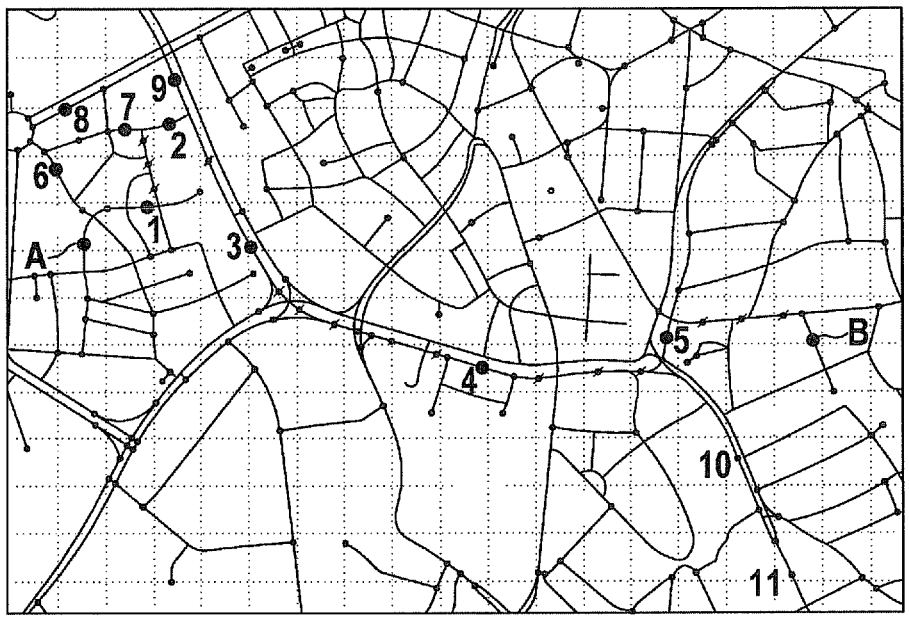

In addition, it should be stored for each link whether the link had already been travelled or not. If the driver chooses a route that is partially known and partially unknown, it is necessary to set, for example, routing points 108 only on the "new" links (that is, subsegments of the travel route). This is done, according to the drawing from FIG. 5, in the same way; in such a case only the corresponding predecessor/successor relationships of the new routing points 108 to previously set routing points 104 should be updated. After the elimination of individual ones of new routing points 108, for example, according to one of the above-described steps, the results are two new routing points (marked 6 and 7), as shown, for example, in FIG. 6. Then the final result may be, for example, a scenario, like the one depicted in the drawing from FIG. 7. The remaining route points are then entered into a list and stored; and this list also notes a relationship between the to individual route points, their predecessors and their successors.

Figure 8:
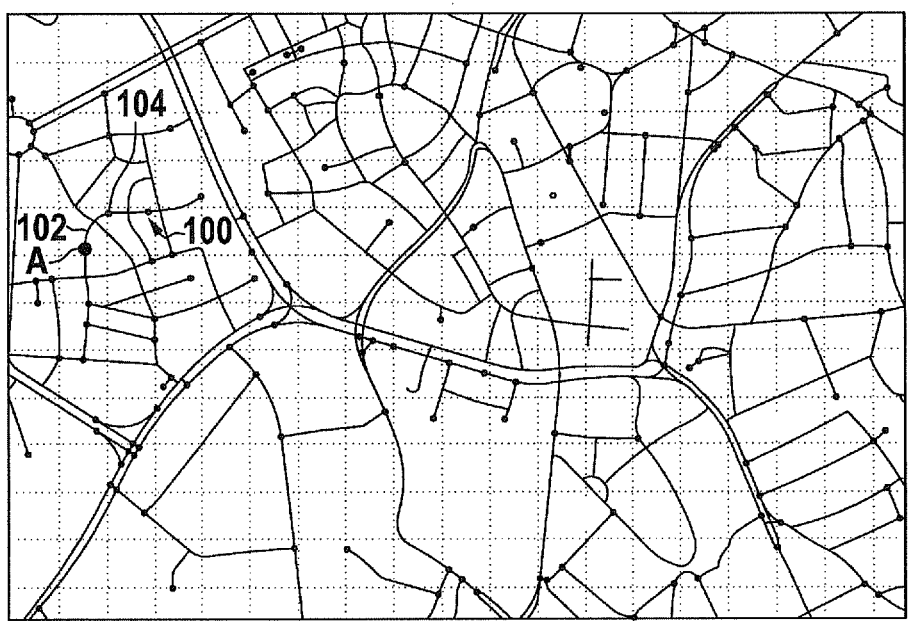
FIGS. 8-13 show in each case a graph of the digital map, on which the travel route from the starting location to the destination location is marked by a plurality of route points; and an additional exemplary embodiment of the present invention was applied to the route points or a corresponding list of route points.
Figure 9:
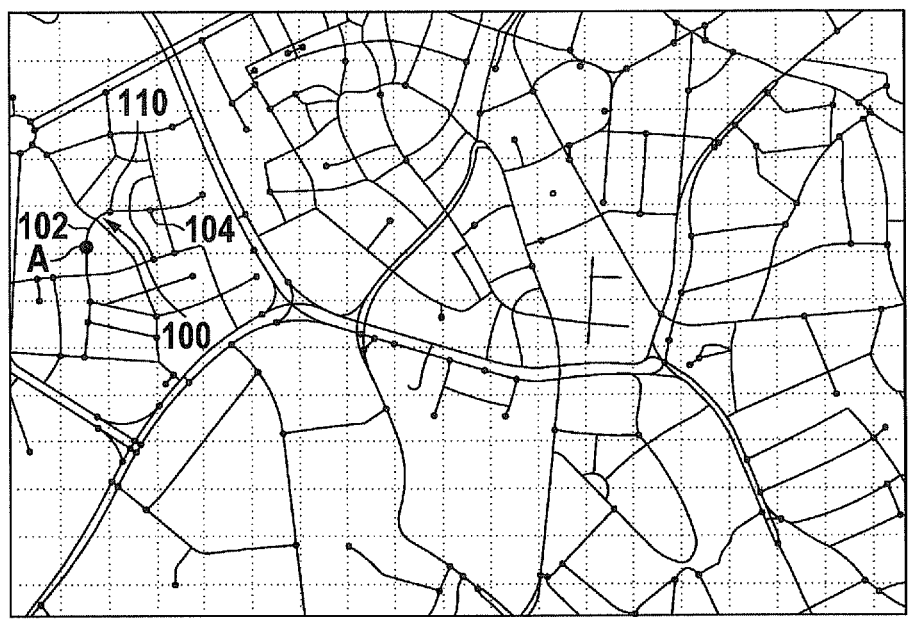
Figure 10:
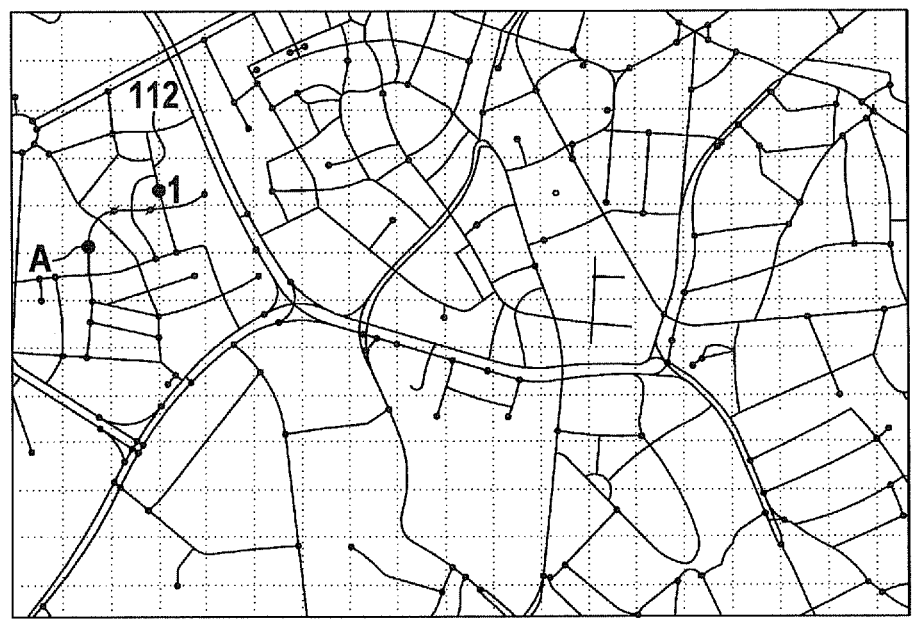
Figure 11:
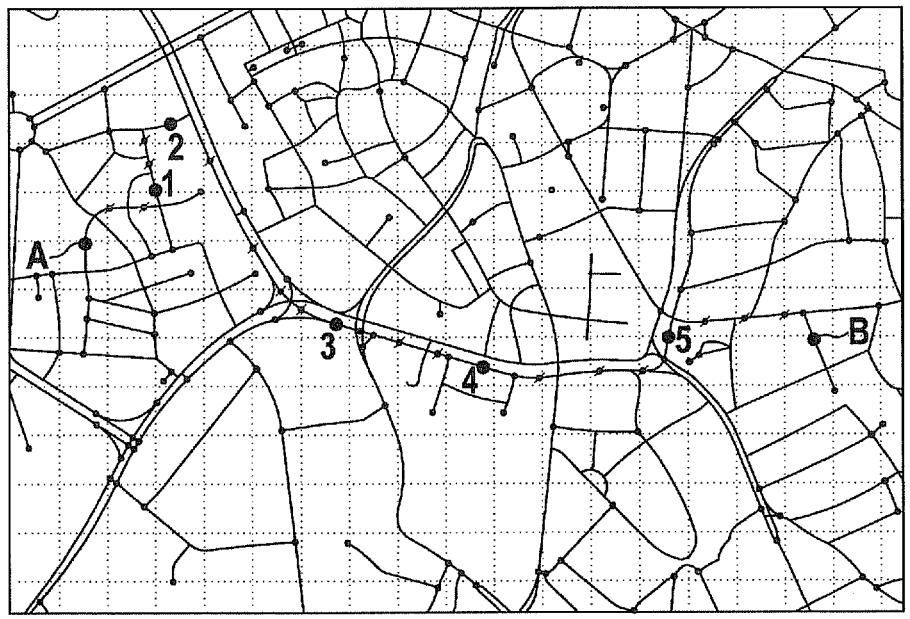

In the second possible variant of the approach that is provided in the present invention, the routing points are specified in real time with the actual travel on links 102. Therefore, this variant may also be called the "as you go" choice. If, for example, the driver starts again at position A, as depicted in FIG. 8 (and at this point the destination point 2 does not have to be known yet and, therefore, is also not entered yet in FIG. 8), the first step is to set a routing point 104 on each link that is not "short". In this context the attribute "short" may be applied to a link 102 or a subsegment of the (desired) travel route that fulfills, for example, a criterion named in the above description. If at this point the driver leaves a link 102 and drives on a new link 102, then it is checked whether the previously set routing point 104 is able to be eliminated by checking the conditions for eliminating successive routing points 104. Therefore, in the example presented in FIG. 8 ff., a previously set routing point 110 can be eliminated, as shown with respect to FIG. 9. FIG. 10 shows by way of example the first necessary routing point 1, because, on the other hand, there would exist two different routes between A and routing point 112 following the routing point 1, that have the same length and thus would violate a possible decoding rule. This strategy can be continued until it is possible to construct a travel route between starting point A and destination point B that exhibits the resulting necessary routing points in accordance with the drawing from FIG. 11. Thus, the procedure for previously unknown subsections or subsegments of the travel route works just like the procedure for a known complete travel route, and the predecessor/successor relationships should be maintained accordingly as in the case of the first variant described above.

Figure 12:
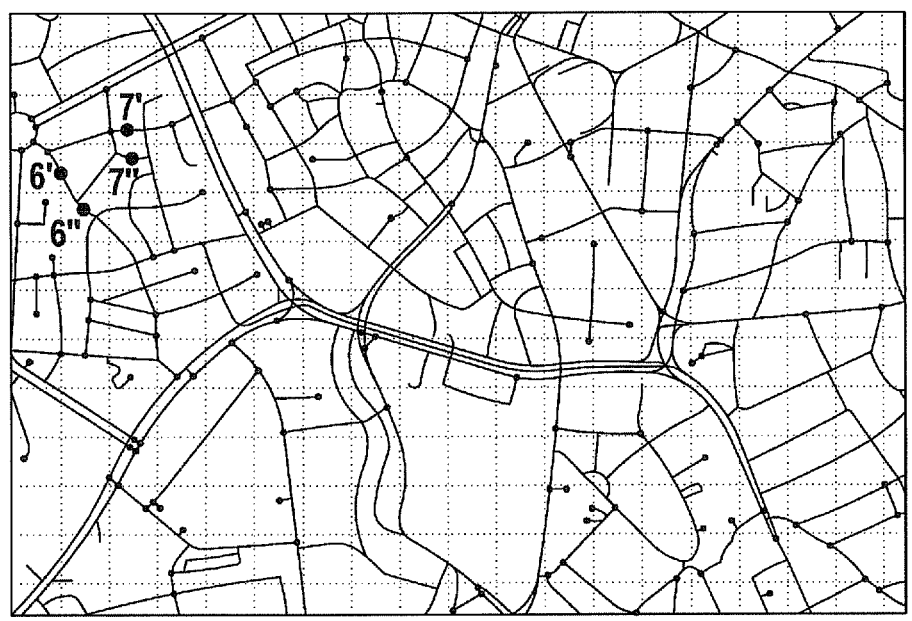

If at this point one obtains a list of route points that represents a desired route of travel and that was prepared, for example, according to the above procedure, then this route of travel can also be transferred to a second digital road map (that is, decoded) without requiring much more effort. The decoding serves to identify the routing points, so that then the subsegments between two routing points that are to be referenced can be gradually identified. The next step starts with a predecessor/successor pair of route points from the list of route points, for example, in the vicinity of the current position that was determined for the vehicle from the geographical coordinates. Depending on the attributes or methods describing the attributes, there exist for the predecessors and successors several possible positions on the second map, as shown in FIG. 12. In the example points 6 and 7 have two alternatives in each case, which are marked 6' and 6" or 7' and 7" in FIG. 12. Then the routes between all alternatives (that is, between 6' and 7', 6" and 7', 6" and 7' or 6" and 7") are calculated. In the event that a route (that is, a distance) having a length that is, for example, approximately the transferred length, exists only between one pair of route points (if the length was stored as attribute for the predecessor/successor relationship between the pair of route points), then the correct route points are identified.

Figure 13:
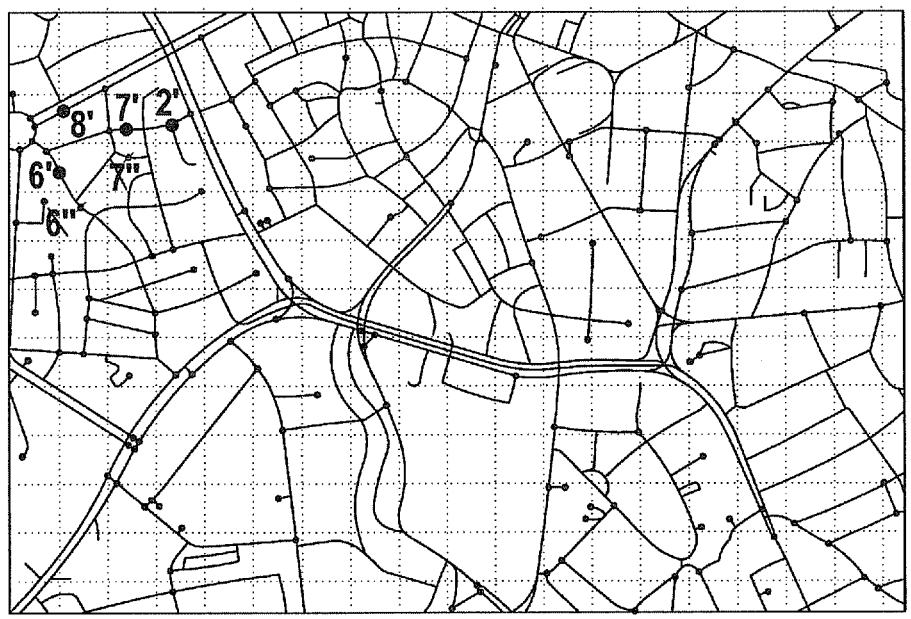

Otherwise, one continues with a successor of the successor or with a different predecessor to the selected successor until a pair could be clearly identified. Then this starting pair makes it easier to identify the other interconnected routing points. In the example from FIG. 13, for instance, routes between points 2' and 8' or between 6' and 8' could be calculated in order to exclude 6" and 7". Then only one possible position exists for these two points respectively.

In order to reduce the effort for the exclusion of alternatives, methods, like MEI-LIN, may be used for referencing the routing points and for early exclusion of the alternatives. If, therefore, a starting pair is identified, then the other points are gradually processed according to a specific algorithm, such as the breadth-first search, in order to be able to decode the entire subgraph in a reasonable amount of time. In addition, the routing algorithm should consider weightings relative to the road class, so that more important roads are given priority.

Figure 14:
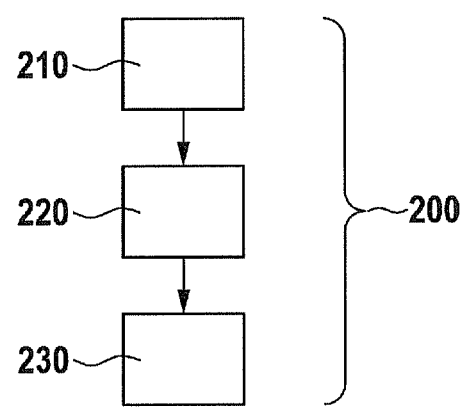
FIG. 14 shows a flow chart of an exemplary embodiment of the present invention as method.

According to the drawing from FIG. 14, the present invention provides, according to one exemplary embodiment, a method 200 for simplifying a description of a travel route which is represented by a list of route points. In this case the method includes a step of reading in 210 a travel route, which is mapped by a list of route points that is represented by a plurality of route points, and each route point represents a different subsegment of a travel route on a digital road map. Furthermore, method 200 has a step of altering 220 the list of route points according to a predetermined algorithm, in order to obtain an altered list of route points that represents the route of travel. Finally the method includes a step of storing 230 the altered list of route points, in order to simplify the description of the route of travel.

Figure 15:
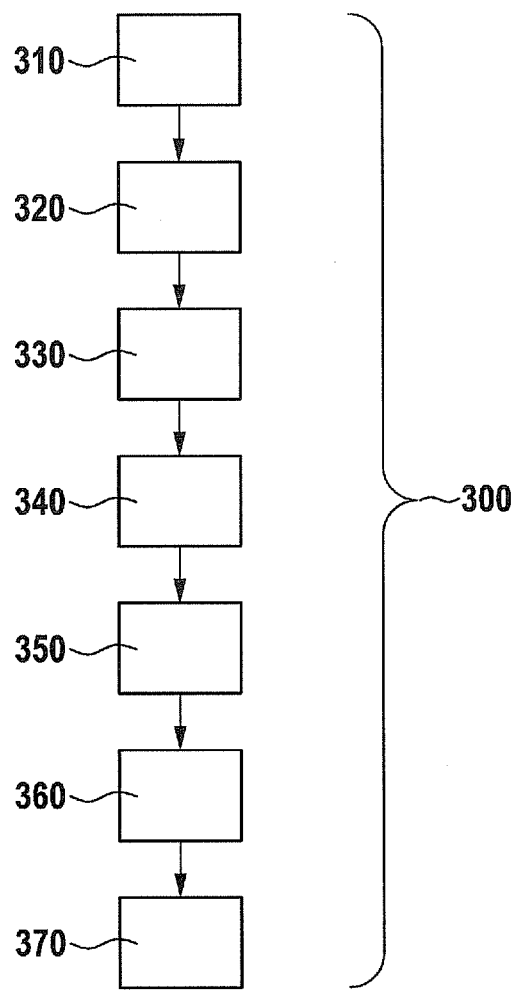
FIG. 15 shows a flow chart of an additional exemplary embodiment of the present invention as method.

According to the drawing from FIG. 15, the present invention provides, according to another exemplary embodiment, a method 300 for decoding a travel route of a vehicle from a list of route points, and the method includes a step of reading in 310 the list of route points, and each route point represents a different subsegment of a travel route to be decoded, on a digital road map. Furthermore, the method includes a step of receiving 320 a digital road map and a step of selecting 330 at least two of the route points and mapping the selected route points onto different first segments on the digital road map, the different first segments representing possible subsegments of a travel route to be selected by the vehicle. Furthermore, method 300 includes a step of determining 340 the entire first distance of the route; and the entire first distance of the route is determined on the basis of the lengths of the individual first segments on the digital road map. Another step of the method 300 also includes mapping 350 of the selected route points onto different second segments of the digital road map, the different second segments representing possible subsegments of the travel route to be selected by the vehicle.

An additional step 360 of method 300 includes determining the entire second distance of the route; and the entire second distance of the route is determined on the basis of the length of the individual second segments on the digital road map. Finally, a step 370 of the method 300 includes the step of allocating the route points to the first segments if the determined first distance of the route is shorter than the determined second distance.

Figure 16:
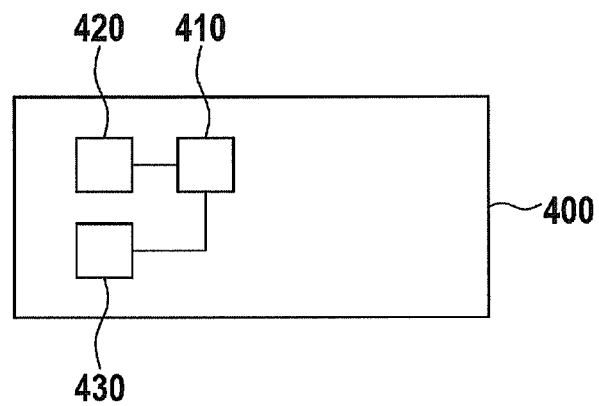
FIG. 16 shows a block diagram of an exemplary embodiment using a navigation device.

Furthermore, the present invention is able to be implemented in a navigation device 410 of a vehicle 400, as shown, for example, in FIG. 16. In this case the navigation device 410 may receive data from a receiver 420 for satellite navigation signals and link the data to a digital map. For example, these data items are loaded into the navigation device 410 from a memory 430 for a digital map. Then the list of route points may be stored in navigation device 410, so that during an update of the digital road map in memory 430 a desired route of travel is able to be realized with the aid of the list of route points stored in navigation device 410.

What is claimed is
1. A method for simplifying a description of a travel route represented by a list of route points for a digital road map of a vehicle navigation device, comprising:
    reading in, by a computer processor, a travel route which is mapped by a list of a plurality of route points, wherein each route point represents a different subsegment of the travel route on the digital road map;
    altering, by the computer processor, the list of route points according to a predetermined algorithm, in order to obtain an altered list of route points representing the travel route; and
    storing, by the computer processor, the altered list of route points in order to simplify the description of the travel route.

2. The method as recited in claim 1, wherein in the step of reading in the travel route, route points which represent geographic coordinates are read in.

3. The method according to claim 2, wherein the algorithm in the altering step is configured to remove from the list the route points which represent a subsegment of the travel route shorter than a predetermined distance.

4. The method as recited in claim 3, wherein additional route points representing subsegments of an alternative of a segment of the travel route are incorporated into the list of route points in the altering step.

5. The method as recited in claim 2, wherein the algorithm in the altering step is configured to remove from the list each $n^{th}$ route point, and wherein the variable n denotes a natural number.

6. The method as recited in claim 2, further comprising:
receiving additional route points representing subsegments of an alternative of a segment of the travel route;
wherein at least one of the additional route points is incorporated into the list of route points in the altering step.

7. The method as recited in claim 2, further comprising:
repeating the method at least once while the vehicle is moving; and
reading in, in the second iteration of the method, at least one new route point representing a current position of the vehicle;
wherein the repeated execution of the method provides an update of the travel route of the vehicle.

8. The method as recited in claim 2, further comprising:
detecting the current position of the vehicle;
matching the detected current position of the vehicle with a subsegment of the travel route represented by a route point; and
adding to the list, in the altering step, a route point representing the currently-traveled subsegment of the travel route, if the route point representing the currently-traveled subsegment of the travel route is not stored in the list.

9. A method for decoding a travel route of a vehicle from a list of route points for a digital road map of a vehicle navigation device, comprising:
reading in, by a computer processor, the list of route points, wherein each route point represents a different subsegment of a travel route to be decoded on a digital road map;
receiving by the computer processor, the digital road map;
selecting, by the computer processor, at least two of the route points and mapping the selected route points onto different first segments on the digital road map, wherein the different first segments represent possible subsegments of a travel route to be selected by the vehicle;
determining, by the computer processor, an entire first distance of the route on the basis of the lengths of the individual first segments on the digital road map;
mapping by the computer processor, the selected route points onto different second segments of the digital road map, wherein the different second segments represent possible subsegments of the travel route to be selected by the vehicle;
determining, by the computer processor, an entire second distance of the route on the basis of the lengths of the individual second segments on the digital road map; and
allocating, by the computer processor, the route points to the first segments if the determined first distance of the route is shorter than the determined second distance.

10. A vehicle navigation device for simplifying a description of a travel route represented by a list of route points for a digital road map, comprising:
a computer processor configured to:
read in a travel route which is mapped by a list of a plurality of route points, wherein each route point represents a different subsegment of the travel route on the digital road map;
alter the list of route points according to a predetermined algorithm, in order to obtain an altered list of route points representing the travel route; and
store the altered list of route points in order to simplify the description of the travel route.

11. A non-transitory computer-readable data storage medium storing a computer program having program codes which, when executed on a computer, perform a method for simplifying a description of a travel route represented by a list of route points for a digital road map of a vehicle navigation device, the method comprising:
reading in a travel route which is mapped by a list of a plurality of route points, wherein each route point represents a different subsegment of the travel route on the digital road map;
altering the list of route points according to a predetermined algorithm, in order to obtain an altered list of route points representing the travel route; and
storing the altered list of route points in order to simplify the description of the travel Route.

* * * * *